United States Patent
Brandon et al.

(10) Patent No.: US 8,556,666 B2
(45) Date of Patent: Oct. 15, 2013

(54) TUNING FORK ELECTRICAL CONTACT WITH PRONGS HAVING NON-RECTANGULAR SHAPE

(75) Inventors: Christopher Alan Brandon, El Paso, TX (US); Adrian Flores, Chihuahua (MX); Frank Romero, El Paso, TX (US); Richard D. Kirkwood, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/399,068

(22) Filed: Feb. 17, 2012

(65) Prior Publication Data

US 2013/0095673 A1    Apr. 18, 2013

Related U.S. Application Data

(60) Provisional application No. 61/547,205, filed on Oct. 14, 2011.

(51) Int. Cl.
*H01R 11/22* (2006.01)

(52) U.S. Cl.
USPC ......................................................... 439/857

(58) Field of Classification Search
USPC ................................................ 439/856, 857
See application file for complete search history.

(56) References Cited

U.S. PATENT DOCUMENTS

| | | | | |
|---|---|---|---|---|
| 3,142,891 A | * | 8/1964 | Travis | 72/376 |
| 3,503,036 A | * | 3/1970 | Desso et al. | 439/857 |
| 3,790,924 A | * | 2/1974 | Sauer | 439/857 |
| 3,915,537 A | | 10/1975 | Harris et al. | |
| 4,317,609 A | * | 3/1982 | Lapraik | 439/733.1 |
| 4,781,611 A | | 11/1988 | Leonard | |
| 4,907,990 A | | 3/1990 | Bertho et al. | |
| 4,943,248 A | * | 7/1990 | Colleran et al. | 439/850 |
| 5,151,056 A | | 9/1992 | McClune | |
| 5,399,108 A | * | 3/1995 | Lu et al. | 439/682 |
| 5,797,774 A | * | 8/1998 | Kaneko | 439/857 |
| 5,876,249 A | * | 3/1999 | Kim | 439/619 |
| 5,957,734 A | | 9/1999 | Gladd et al. | |
| 5,980,337 A | | 11/1999 | Little | |
| 5,989,072 A | | 11/1999 | Hickox et al. | |

(Continued)

FOREIGN PATENT DOCUMENTS

EP    777306 A1    6/1997

OTHER PUBLICATIONS

International Search Report dated Dec. 24, 2012.

*Primary Examiner* — Gary F. Paumen
(74) *Attorney, Agent, or Firm* — Robert J. Myers (57) ABSTRACT

An electrical contact includes a pair of prongs that extend from a base of the electrical contact spaced apart by a gap disposed therebetween. The gap is configured to receive a mating electrical contact that mechanically and electrically communicates with the pair of prongs. A plane defined along respective exterior surfaces of the pair of prongs is such that a portion of one prong of the pair of prongs is bisected by the plane. A method of making an electrical contact includes a step of stamping out a piece from a sheet of electrically-conducting material and another step of folding one or more portions of the piece to at least produce the pair of prongs of the electrical contact spaced apart by the gap. An electrical assembly includes a printed circuit board and at least one electrical contact that contains the pair of prongs.

19 Claims, 6 Drawing Sheets

(56) References Cited

U.S. PATENT DOCUMENTS

| | | | |
|---|---|---|---|
| 6,062,916 A | 5/2000 | Gladd et al. | |
| 6,135,784 A * | 10/2000 | Pei | 439/70 |
| 6,638,119 B1 * | 10/2003 | Chang | 439/857 |
| 7,137,841 B1 * | 11/2006 | Liao et al. | 439/342 |
| 7,331,831 B2 * | 2/2008 | Cvasa | 439/857 |
| 7,744,431 B2 * | 6/2010 | Trout et al. | 439/733.1 |
| 7,864,544 B2 | 1/2011 | Smith et al. | |
| 8,016,623 B2 * | 9/2011 | Ju | 439/856 |
| 2001/0010979 A1 | 8/2001 | Ortega et al. | |
| 2003/0199210 A1 * | 10/2003 | Chang | 439/857 |
| 2005/0245144 A1 * | 11/2005 | Hegel | 439/857 |
| 2010/0219930 A1 | 9/2010 | Oh et al. | |

* cited by examiner

TUNING FORK ELECTRICAL CONTACT WITH PRONGS HAVING NON-RECTANGULAR SHAPE

RELATED DOCUMENTS

This application claims priority to provisional application U.S. Ser. No. 61/547,205 filed on Oct. 14, 2011.

TECHNICAL FIELD

The invention relates to an electrical contact, more particularly, an electrical contact includes opposing tuning fork prongs in which each prong has a non-rectangular cross section area.

BACKGROUND OF INVENTION

Conventional, planer tuning fork-type terminals are used in electrical applications as an electrical interface connecting an electrical component having blade terminals, such as a fuse or relay, with a printed circuit board (PCB).

One such conventional planer tuning fork-type terminal (1) is described in U.S. Pat. No. 6,062,916 and is shown in prior art FIG. 1. The planar tuning fork-type terminal (1) generally has opposing cantilevered beams, or prongs (2) that are spaced apart in which each prong has a square or a rectangular cross section area. The tuning fork-type terminal (1) also has a thickness t that is about a thickness of the sheet of metal material from which the terminal (1) is stamped. A first external surface (3) of the terminal (1) generally has a planar, parallel relationship with an opposing second external surface (4). A gap (5) receives a mating blade terminal of the corresponding fuse or relay. A mounting portion (6) of the terminal (1) is configured to fit within an aperture (7) defined in a printed circuit board (PCB) (8). A single, typical bussed electrical center (BEC) used in a motorized vehicle, for example, may require 25 to 75 of these conventional planar tuning fork terminals (1). As BEC electrical devices continue to be utilized in vehicles, the need for tuning fork terminals may remain constant or even increase. It is desirable to have a tuning fork terminal that has a lower mass that may be fabricated at a lower cost while at least maintaining the electrical and the mechanical performance properties of at least the current, planer tuning fork-type terminal (1). A BEC device employing a plurality of tuning fork terminals that collectively have lower mass may allow a vehicle that employs the BEC device to also have lower mass which may result in a desired, increased fuel economy rating for the vehicle.

Thus, what is needed is an electrical contact that allows for a robust electrical connection to a blade terminal of an electrical device and also has robust electrical and mechanical connection to a PCB that has decreased mass and a lower fabrication cost over at least conventional planar tuning fork-type terminals.

SUMMARY OF THE INVENTION

In accordance with one embodiment of the invention, an electrical contact includes a pair of prongs that extend from a base of the electrical contact spaced apart by a gap disposed therebetween. The gap is configured to receive a mating electrical contact that at least electrically communicates with the pair of prongs. A plane is defined along respective exterior surfaces of the pair of prongs is such that a portion of at least one prong in the pair of prongs is bisected by the plane.

In accordance with another embodiment of the invention, a method of fabricating an electrical contact includes a step of stamping out a piece from a sheet of electrically-conducting material. Another step in the method is folding one or more portions of the piece to at least produce a pair of prongs of the electrical contact spaced apart by a gap. A plane defined along respective external surfaces of the pair of prongs is disposed so that the plane bisects respective portions of the pair of prongs.

In accordance with yet another embodiment of the invention, an electrical assembly includes at least one printed circuit board (PCB) and at least one electrical contact disposed on the PCB. The electrical contact includes a pair of prongs where a plane defined along respective exterior surfaces of the pair of prongs is such that a portion of at least one prong in the pair of prongs is bisected by the plane.

These and other advantageous features as disclosed in the embodiments of the present invention will be become apparent from the following brief description of the drawings, detailed description, appended claims and drawings.

BRIEF DESCRIPTION OF THE DRAWINGS

This invention will be further described with reference to the accompanying drawings in which.

DETAILED DESCRIPTION

An electrical contact assists in the transmission of electrical signals from one electrical device or circuit to another. In some electrical applications, the transmission of the electrical signals are routed through one or more printed circuit boards (PCBs). Electrical contacts may find use in many types of electrical applications in the transportation industry such as the airline, automobile, marine, and trucking industries.

Figure 1:
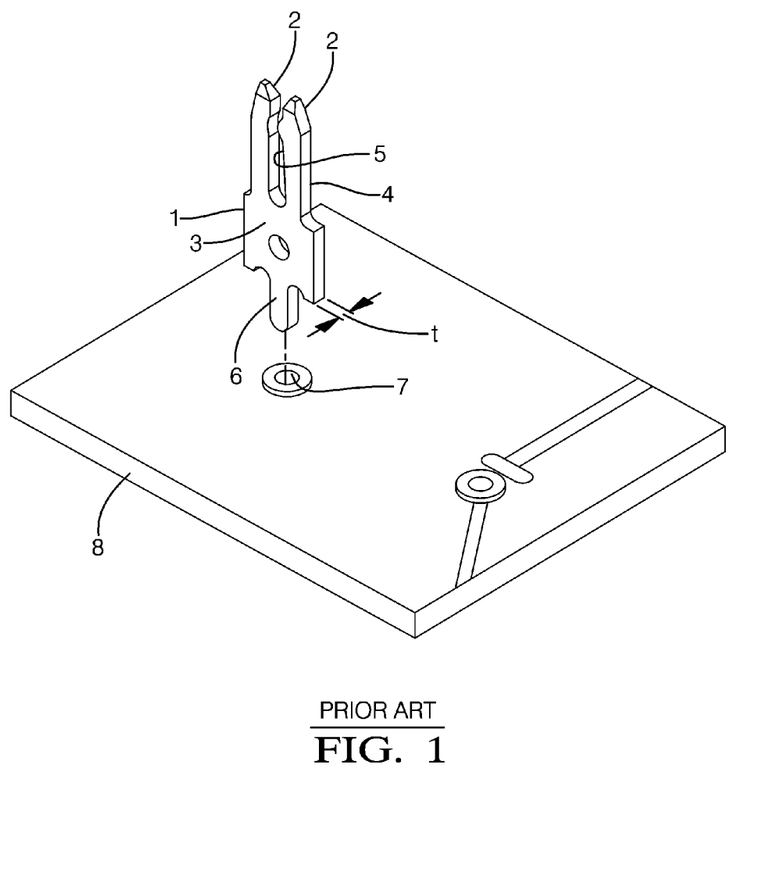
FIG. 1 shows a prior art conventional, planar tuning fork-type terminal.
Figure 2:
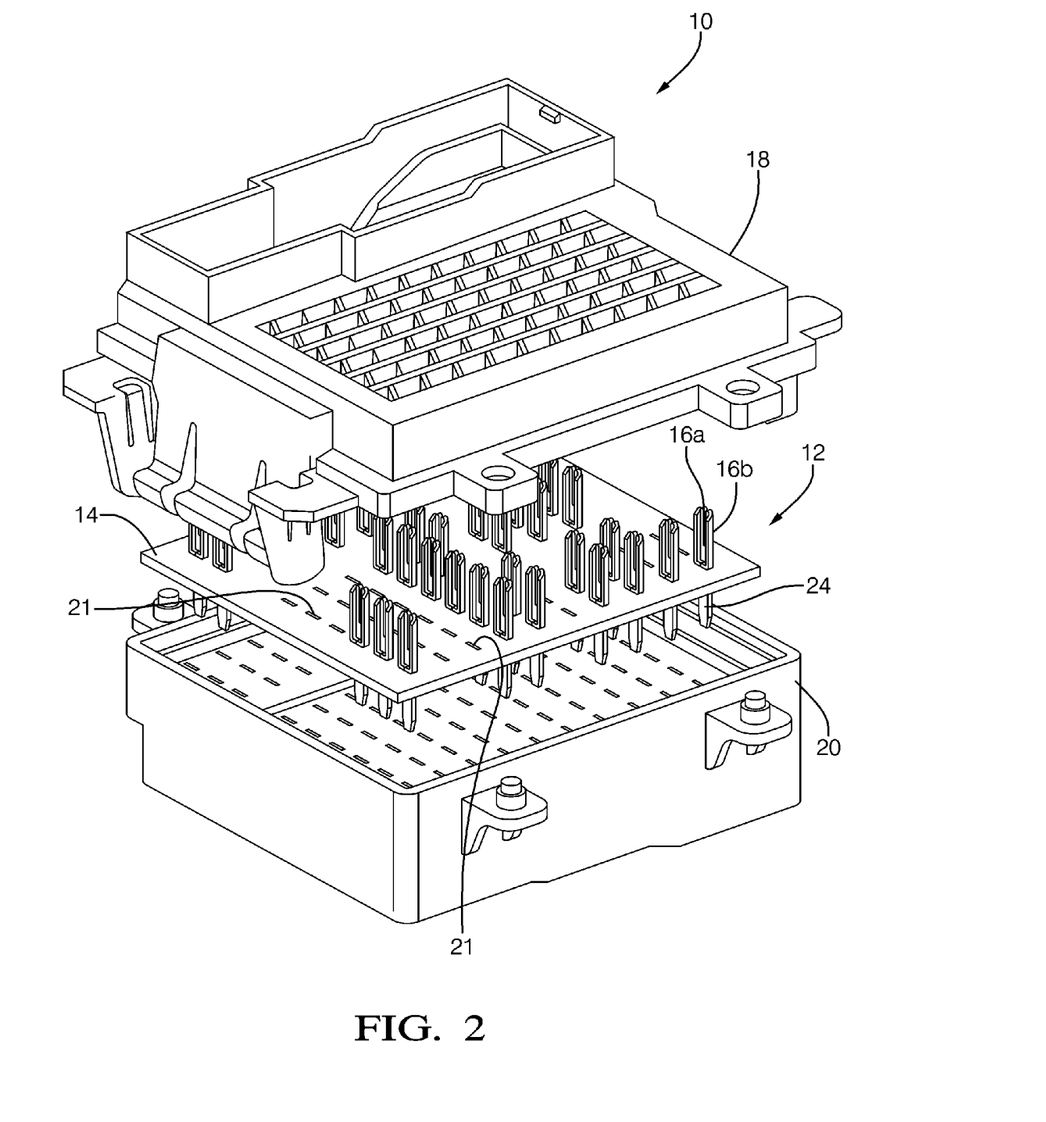
FIG. 2 shows a bussed electrical center (BEC) that employs an electrical contact that includes opposing prongs that respectively have non-rectangular cross section shape, in accordance with the invention.
Figures 3, 4:
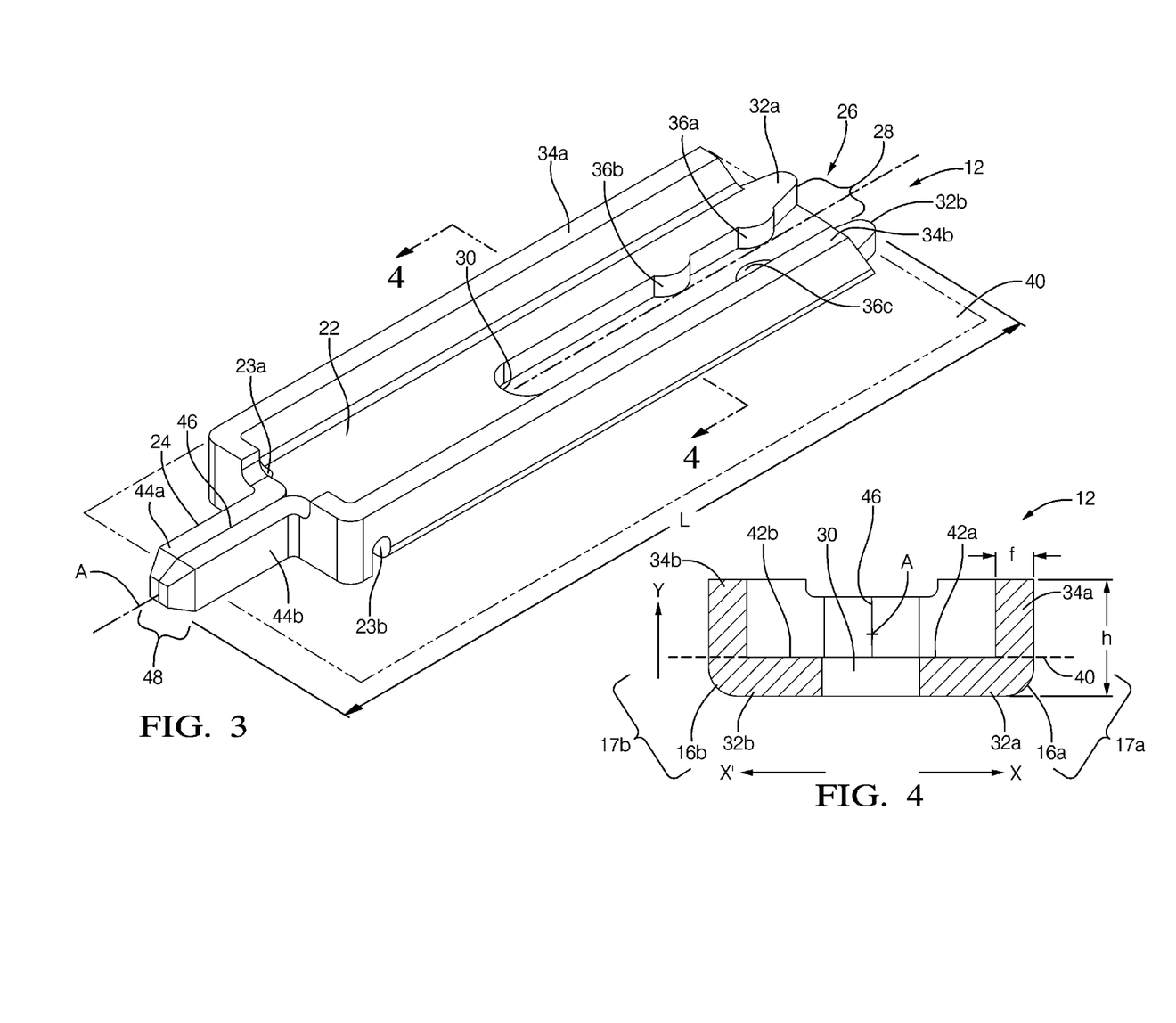
FIG. 3 shows a perspective view of the electrical contact of FIG. 2, and details thereof.
FIG. 4 shows a cross section view of the electrical contact of FIG. 3, through the lines 4-4.

In accordance with an embodiment of this invention, referring to FIG. 2, a bussed electrical center (BEC) 10 is used in a vehicular application that utilizes a plurality of tuning fork electrical contacts 12. BECs may be used for power distribution and management of electrical signals in the vehicle environment. Alternately, BECs may further be used to operatively control vehicle body electronics, such as interior vehicle lighting and power switching. Tuning fork electrical contacts 12 are disposed on a printed circuit board (PCB) 14. Referring to FIGS. 2-4, each electrical contact 12 has a pair of prongs 16a, 16b and each prong 16a, 16b has a non-rectangular cross section shape 17a, 17b in contrast to the square or rectangular cross section prongs of the conventional tuning fork-type terminal shown in prior art FIG. 1. BEC 10 has an upper housing 18 that receives and fits at least the blade terminals of electrical fuses or electrical relays and the like, and a lower housing 20. PCB 14 fits within BEC 10 being disposed intermediate upper and lower housings 18, 20 and may be fastened therein with any type of fastener such as screws. The upper and lower housings 18, 20 may also be fastened together with screws. Tuning fork electrical contact 12 is insertable in a through hole 21, such that after insertion therein, is soldered to PCB 14. The insertion of electrical contact 12, for example, may be done manually by a human operator in a manufacturing assembly process or inserted by a machine used on an automated assembly line. When electrical contact 12 is soldered to PCB 14, contact 12 is mechanically secured to PCB 14 and also electrically connected with a corresponding electrical circuit further disposed on PCB 14 and/or disposed external to PCB 14 and/or BEC 10 when BEC 10 is electrically connected in an electrical application. The corresponding electrical circuit(s) disposed internal or external to the BEC may include resistors, capacitors, inductors, integrated circuits, relays, and any other type of electrical devices, as are known in the electrical arts.

Referring to FIG. 3, electrical contact 12 has a length L disposed along a longitudinal axis A. Electrical contact 12 includes a base 22. Pair of prongs 16a, 16b axially extend outwardly away from base 22. A mounting tail 24 outwardly extends from base 22 in an axially opposing direction to that of prongs 16a, 16b. Base 22 further defines cutouts 23a, 23b therethrough that advantageously facilitate fabrication of electrical contact 12. Electrical contact 12 and cutouts 23a, 23b are stamped out from an electrically-conductive, metal sheet of material using a stamping press as is known in the electrical contact art. Prong 16a axially mirrors prong 16b across axis A along a portion of length L of electrical contact 12. Prong 16a has an opposingly spaced relationship from prong 16b being separated by a gap 26 defined in electrical contact 12. Gap 26 is bounded by prongs 16a, 16b, a closed end 30 of electrical contact 12, and an open end 28. Open end 28 has a remote, axially opposed relationship with closed end 30. As closed end 30 is adjacent base 22, prongs 16a, 16b axially extend outwardly away from closed end 30. In contrast, mounting tail 24 is disposed at the other end of electrical contact 12 axially remote from open end 28 and is configured for insertion in a sufficiently sized through hole 21 defined in PCB 14. Mounting tail 24 includes a tapered end 48 that advantageously facilitates the guiding of mounting tail 24 insertion in to through hole 21 of PCB 14. Preferably, through hole 21 is a plated through hole so that when mounting tail 24 is inserted in plated through hole 21, mounting tail 24 solderable in plated through hole 21 by any means known in the electrical arts. A portion of mounting tail 24 protrudes through PCB 14, as best illustrated in FIG. 2, in which the amount of the protrusion of the mounting tail is dependent on a thickness of the PCB. Alternately, the PCB may be a thickness that does not allow any mounting tail protrusion. In still other electrical applications, a protruding mounting tail may be covered over with a sheath formed from a dielectric material. The sheath may further prevent an undesired electrical short between the otherwise extended mounting tail and an electrical circuit in the electrical application of use. Through hole 21 may be plated with another metal, like gold or silver, to further enhance the electrical conductivity between the electrical contact and circuit board trace disposed on PCB 14. Alternately, the through hole may be unplated. In another alternate embodiment, the through hole may be sized such that the electrical contact has a snug fit after insertion therein. Still yet alternately, electrical trace on the PCB may surround the through hole on any surface of the PCB adjacent the through hole such that at least a portion of the electrical contact may be directly soldered to the electrical trace.

Electrical contact 12 may be formed from any type of electrically-conducting material, such as a metal material. Preferably, the electrical contact is formed from a metal material made of copper or copper alloy. Even more preferably, the electrical contact is formed from a tempered spring copper material. With the increase in the cost of copper and copper materials in the marketplace in recent years, it becomes that much more cost advantageous to reduce the amount of copper material needed to construct electrical contacts such as may be imbued by the fabrication of electrical contact 12.

Referring to FIGS. 3 and 4, prongs 16a, 16b respectively include a contacting portion 32a, 32b and a non-contacting outer side rail portion 34a, 34a. Contacting portion 32a in integral combination with side rail portion 34a, when viewed in cross section as best illustrated in FIG. 4, has non-rectangular cross section shape 17a. Similarly, contacting portion 32b in combination with side rail portion 34b, when viewed in cross section, also has non-rectangular cross section shape 17b. Contacting portions 32a, 32b further include raised contacting nubs 36a, 36b, 36c that are formed respectively on prongs 16a, 16b that inwardly face gap 26. Raised contacting nubs 36a, 36b are associated with contacting portion 32a and contacting nub 36c is associated with contacting portion 32b. When a mating blade terminal of a fuse or relay is axially received in gap 26 along axis A, the inserted blade terminal passes through open end 28 and makes mechanical and electrical contact with contacting surfaces of contacting nubs 36a, 36b, 36c disposed adjacent gap 26. Alternately, the prongs may include any number of raised contacting nubs in any type of arrangement disposed on prongs. Non-rectangular cross section shapes 17a, 17b respectively have an L-shaped cross sectional shape. Furthermore, contacting portions 32a, 32b are disposed along in a X- and an X'-direction respectively outwardly away from, and transverse to axis A. The X'-direction is a direction that is opposite the X-direction, as best illustrated in FIG. 4. Non-contacting portions 34a, 34b are disposed in a Y-direction perpendicular to respective external surfaces 42a, 42b of prongs 16a, 16b.

Non-contacting portions 34a, 34b are disposed parallel with and spaced apart from axis A and extend along a majority portion of length L of electrical contact 12. Each non-contacting portion 34a, 34b is spaced apart from axis A by about a same distance. Non-contacting portions 34a, 34b advantageously add structural rigidity to electrical contact 12 so that a thickness f of electrical contact 12 may be less than the thickness t of a similarly sized conventional planer tuning fork-type terminal as previously described in the Background herein and shown in prior art FIG. 1. A plane 40 defined along respective external surfaces 42a, 42b of contacting portion 32a, 32b of prongs 16a, 16b results in at least a portion of non-contacting portions 34a, 34b of each prong 16a, 16b being bisected by plane 40, as best illustrated in FIGS. 3 and 4. Referring to FIG. 3, plane 40 bisects non-contacting portion 34a from contacting portion 32a of prong 16a and non-contacting portion 34b from contacting portion 32b of prong 16b.

Mounting tail 24 is formed from a plurality of distinct, extended sections 44a, 44b of electrical contact 12 during fabrication of electrical contact 12. Each section 44a, 44b, has a tapered portion so that when electrical contact 12 is constructed, tapered end 48 is formed, as best illustrated in FIG. 3, and as previously described herein. Extended sections 44a, 44b are folded during fabrication of electrical contact 12 from the piece of electrically-conducting material so that an axial seam 46 is formed along mounting tail 24, as best illustrated in FIG. 3. Extended sections 44a, 44b are rearward extensions of non-contacting portions 34a, 34b of each prong 16a, 16b.

Figure 5:
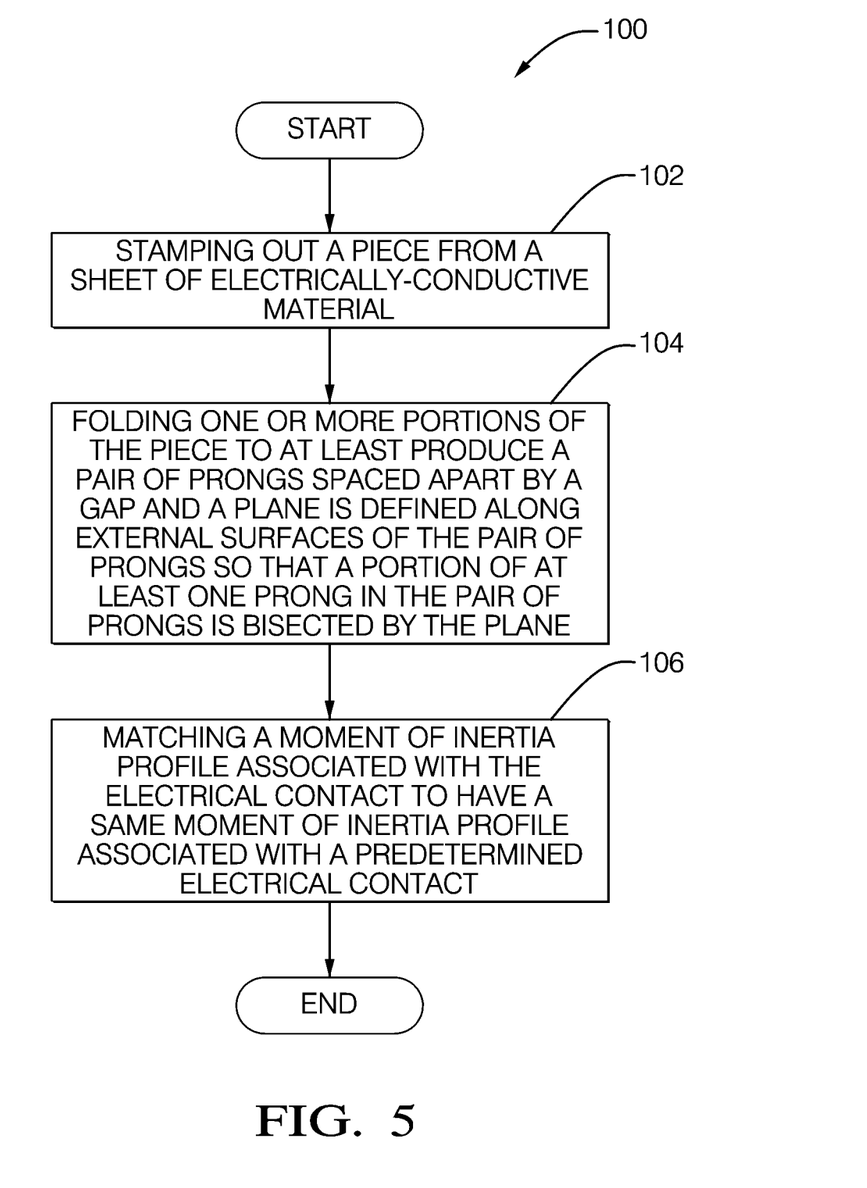
FIG. 5 shows a method of fabricating the electrical contact of FIG. 2.

The electrical contact is stamped from the metal sheet of material using the stamping press as previously described herein. At least a portion of mounting tail 24 is also bisected by plane 40 after formation from extended sections 44a, 44b. Advantageously, extended sections 44a, 44b of mounting tail 24 have a yielding, or compliant characteristic that that may allow insertion of electrical contact 12 in a through hole that has a larger tolerance variation over through holes that fit the current planer tuning fork-type terminal previously described in the Background herein Referring to FIG. 5, a method 100 to fabricate electrical contact 12 is presented. Method 100 includes a step 102 of stamping out a piece from the sheet of electrically-conducting material that is sufficient to construct electrical contact 12. Another step 104 of method 100 includes folding one or more portions of the piece to at least produce a pair of prongs 16a, 16b of electrical contact 12 spaced apart by gap 26. Plane 40 defined along respective external surfaces of pair of prongs 16a, 16b is disposed so that plane 40 bisects respective portions of pair of prongs 16a, 16b. Another step 106 in method 100 is matching a moment of inertia profile (not shown) associated with electrical contact 12 to have a same moment of inertia profile as a moment of inertia profile associated with a predetermined electrical contact (not shown). For example, the predetermined electrical contact may be the conventional planar tuning fork-type terminal as previously described herein in the Background and as shown in prior art FIG. 1. When electrical contact 12 has the same moment of inertia as the predetermined electrical contact, this ensures robust electrical and mechanical mating contact of the mating blade terminal to electrical contact 12. The moment of inertia profile is manifested in electrical terminal 12 by appropriately dimensioning, either individually or in combination, a variety of structural elements of electrical terminal 12. Some of these structural elements, referring to FIGS. 3 and 4, may include thickness f of the piece that forms electrical contact 12, a length of non-contacting portion 34 along length L of electrical contact 12, or a height h of non-contacting portion 34. The parameter values of the various structural elements may be obtained by analysis of the moment of inertia of the cross sectional area of the prongs of the predetermined electrical contact which then becomes a function of the parameter values of the various structural elements of electrical contact 12. The analysis may be undertaken by use of a computer and computer programs that are configured to conduct structural analysis. Further analysis may optimize the parameter values of the structural elements needed for electrical contact 12. Preferably, step 106 of matching the moment of inertia profile occurs prior to step 102 and step 104 in method 100. Thus, the matching of the moment of inertia of a square or rectangular cross section beam, or prong to that of a non-rectangular prong as in electrical contacts 12, 213, in essence, replaces the mass of the rectangular cross section prong with a prong having a different structure in which the different structure is the non-rectangular L-shaped cross section prong as described herein. It has been observed that an electrical contact containing the L-shaped prongs over a similarly sized electrical contact having a rectangular cross section prong may result in the reduction of thickness needed for the electrically-conductive material from which electrical contact 12, 250 is stamped. However, electrical contact 12, 250 having the non-rectangular cross section prongs has a same structural strength as that of the predetermined, rectangular pronged electrical contact due to the matching of the moment of inertia profile. It has also been observed that one electrical contact having a non-rectangular cross section has a mass decrease of about 40% over a similarly-sized square or rectangular pronged electrical contact. Even with this desired decrease in mass, the overall footprint of the electrical contact may increase somewhat due to the non-rectangular structure imposed over that of a similarly-sized electrical contact having a square or rectangular cross section prongs.

Electrical contact 12 is not in use when not inserted in a through hole 21 of PCB 14 and the blade terminal of the relay or fuse electrical device is not received in gap 26 to mechanically and electrically engage against contacting nubs 36a, 36b, 36c.

Electrical contact 12 is partially in use when either mounting tail 24 is attached to through hole 21 in PCB 14 and/or if the mating blade terminal of the relay or the fuse electrical device is received in gap 26 to engage nubs 36a, 36b, 36c.

Electrical contact 12 is in use when mounting tail 24 is attached to PCB 14 and the mating blade terminal of the electrical device is received in gap 26 to engage nubs 36a, 36b, 36c.

Figure 6:
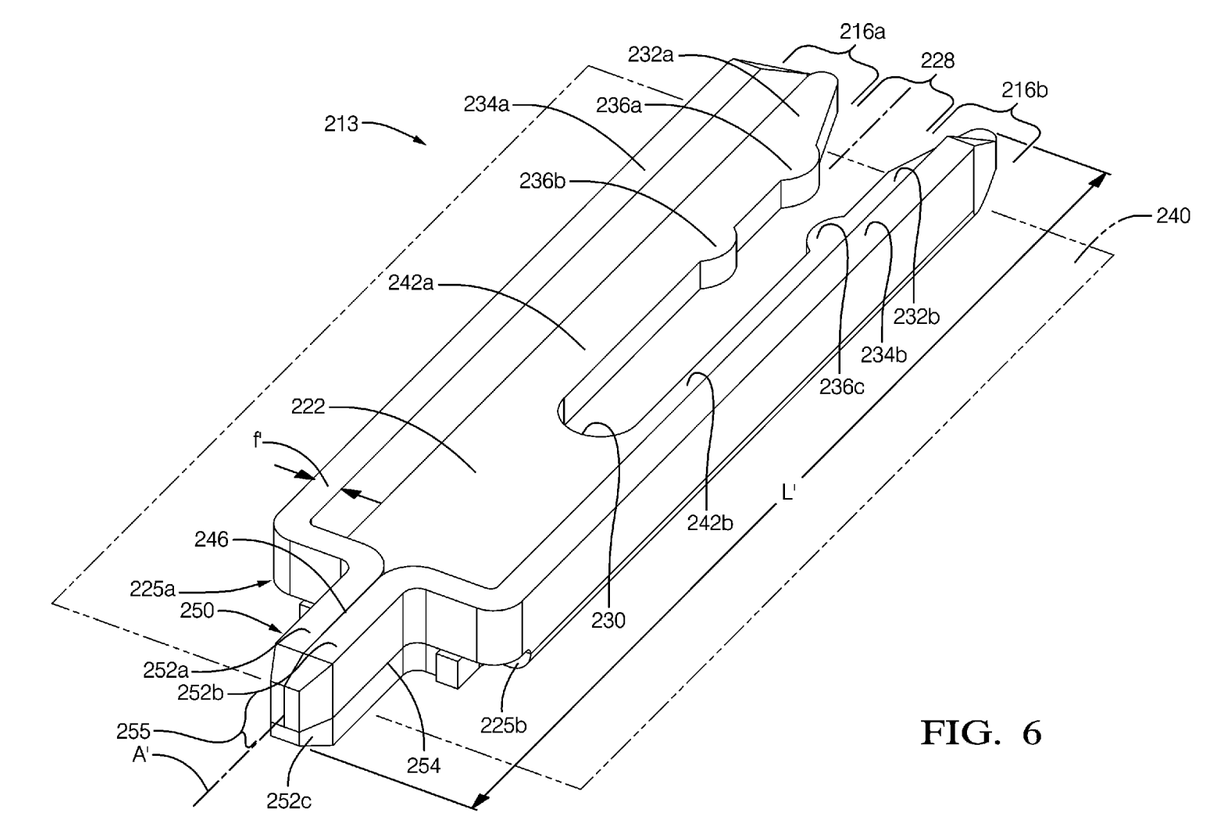
FIG. 6 shows an electrical contact, and details thereof, according to an alternate embodiment of the invention.

Referring to FIGS. 6 and 7A-7D, an electrical contact 213 is presented according to an alternate embodiment of the invention. Referring to FIG. 6, electrical contact 213 is disposed along a longitudinal axis A' having a length L'. Elements of electrical contact 213 of FIGS. 6 and 7 similar to those of electrical contact 12 of FIG. 3 have reference numerals that differ by 200. Mounting tail 24 of electrical contact 12 as illustrated in FIG. 3 is formed from two extended sections 44a, 44b. In contrast, electrical contact 213 has a mounting tail 250 formed from three (3) extended sections 252a, 252b, 252c. Sections 252a, 252b are extensions of non-contacting portions 234a, 234b extending from prongs 216a, 216b rearward to mounting tail 250 similar to that of electrical contact 12 in the embodiment of FIG. 3. Third section 252c extends from a base 222. Each section 252a, 252b, 252c includes a tapered portion so that when electrical contact 213 is constructed, a tapered end 255 is formed. Tapered end 255 facilitates insertion of mounting tail 250 in a PCB similar to tapered end 48 of electrical contact 12 in the embodiment of FIG. 3. When sections 252a, 252b, 252c form mounting tail 250, an axial seam 246 and an axial, laterally disposed seam 254 are also formed along mounting tail 250. Laterally disposed seam 254 adjacently spans across sections 252a, 252b. A three section tail 252a, 252b, 252c advantageously adds additional overall mechanical strength to electrical contact 213 greater than that of mounting tail 24 in the embodiment of FIG. 3 and further provides another direct electrical path between contacting sections 234a, 234b of prongs 216a, 216b and mounting tail 250 so that electrical resistance associated with this additional electrical path is minimized. As plane 240 is disposed along external surfaces 242a, 242b in which these external surfaces extend on to the external surface of section 252c, plane 240 bisects at least a portion of mounting tail 250. Cutouts 225a, 225b disposed adjacent to base 222 serve to assist the formation of mounting tail 250 from a stamped piece of electrically-conducting material similar to cutouts 23a, 23b of electrical contact 12 of the embodiment illustrated in FIG. 3. The cutouts 225a, 225b of FIGS. 6 and 7 may have a different shape than the cutouts 23a, 23b of FIG. 3. Electrical contact 213 is formed from the same materials and stamped out with a stamping press in a similar manner to electrical contact 12 as previously discussed herein.

Figure 7A:
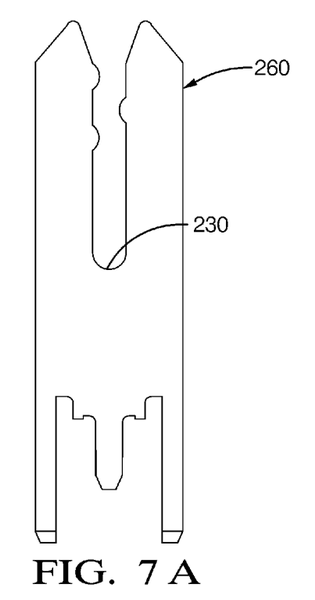
FIGS. 7A-7D shows a progression of fabrication steps necessary to construct the electrical contact of FIG. 6.
Figure 7B:
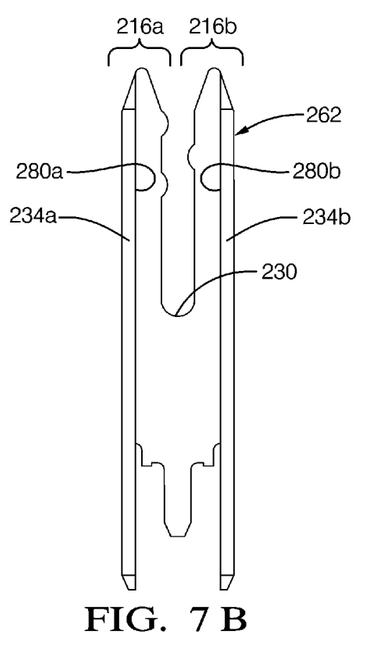
Figure 7C:
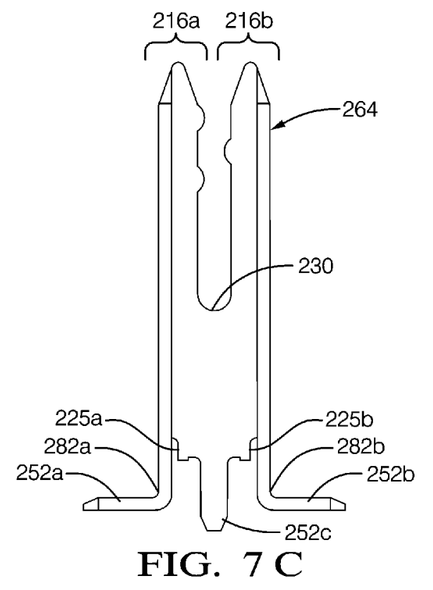
Figure 7D:
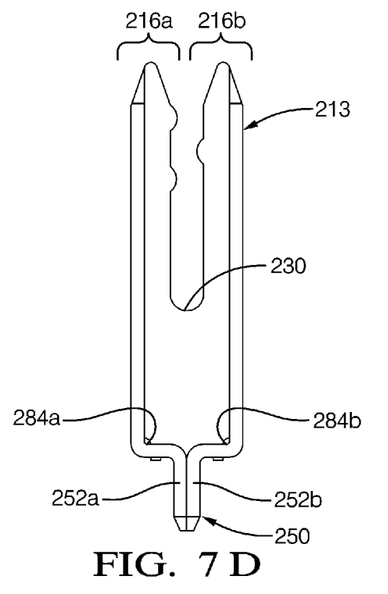

Referring to FIGS. 7A-7D, a series of fabrication steps for electrical contact 213 are illustrated. FIG. 7A shows electrical contact 213 as a planar, stamped piece of electrically conducting material 260. FIG. 7B shows electrical contact 213 when first folds 280a, 280b are made to form an electrical contact having a first fold 262. FIG. 7C shows electrical contact 213 as an electrical contact with a second fold 264 when second folds 282a, 282b are made to flare out the sections of non-contacting portion 234a, 234b extending from prongs 216a, 216b along electrical contact 264. FIG. 7D shows electrical contact 213 in a final form after third folds 284a, 284b are made so that mounting tail 250 is formed. Referring to FIG. 3, cutouts 23a, 23b in electrical contact 12 disposed proximate mounting tail 24 also allow the plurality of sections of electrical contact 12 to be appropriately folded to form mounting tail 24 during construction of electrical contact 12 in a similar fashion to that of mounting tail 250 of electrical contact 213 as illustrated in FIGS. 7A-7D.

Alternately, a pair of opposing raised contacting nubs may be disposed on the contacting portion of the prongs of the electrical contact in contrast to the staggered nub arrangement as previously described herein and best illustrated in FIG. 3. The pair of opposing nubs may provide a desired higher normal force compression engagement of the prongs against the mating blade terminal of the electrical device received in the gap. The staggered nub arrangement may undesirably apply a bending moment on the received blade terminal that may relax over a time period when disposed in an electrical application such that an unreliable electrical connection may develop. An unreliable electrical connection may result in faulty electrical operation of electrical devices or electrical systems connected by the unreliable electrical connection. The unreliable electrical connection may require service to repair that increases the cost to service the electrical contact in the electrical application of use. The electrical contact may include any number of nubs disposed in any kind of arrangement and be within the spirit and scope of the invention.

Still alternately, the sections of the mounting tail may be folded in manner that allows the sections to be spaced apart along at least along a portion of the seam of the electrical contact 12 of FIG. 3 or electrical contact 213 of FIG. 6, preferably at the end of the mounting tail disposed axially closer to the prongs of the respective electrical contacts. This space would be visible to the eye of a human assembler in the normal state of the electrical contact when the electrical contact is not inserted in a through hole of the PCB and/or not connected with a blade terminal of the electrical device received by the electrical contact. This intended space may further allow the mounting tail to have even greater compliancy over mounting tails 24, 250.

Still yet alternately, external surfaces of the electrical contact may further be plated with a material that enhances the electrical conductivity of the electrical contact. Preferably, the plating material is a metal material. Even more preferably, the metal material is tin or silver. In one embodiment, the tin is pre-plated on a metal sheet of material from which the electrical contact piece is initially stamped. In another embodiment, the silver metal material is electroplated on the electrical contact after the electrical contact is fabricated.

Thus, an electrical contact allows for a robust electrical connection to electrically connect a blade terminal of an electrical device to a PCB that has decreased mass and a lower manufacturing cost over a similarly sized conventional planer tuning fork-type terminal as shown in prior art FIG. 1. Utilizing the moment of inertia profile to produce an electrical contact that has prongs having a non-rectangular cross section area allows the electrical contact to be constructed having a differently structured prong that results in an electrical contact that has less mass. It has been observed that the mass of the electrical contact having the prongs containing the non-rectangular cross section areas may have a mass that is forty percent (40%) less than a mass of a current, similarly sized planar tuning fork-type terminal having rectangular cross section as shown in prior art FIG. 1. Moreover, the electrical contact having prongs that contain the non-rectangular cross section areas may be formed from a sheet of material that is about one-half (½) the thickness needed to construct the conventional, similarly sized planer tuning fork-type terminal as shown in prior art FIG. 1. The thinner stock thickness of the material from which the electrical contact is formed may also provide improved thermal properties of the electrical contact when the electrical contact is employed in electrical applications. The lower mass electrical contact has a same moment of inertia profile as that of a predetermined electrical contact so that the lower mass electrical contact, as described herein, may be a drop-in replacement in electrical circuit applications that formerly used the conventional, current planer tuning fork-type terminals. The mounting tail formed from extended sections of the electrical contact provide a compliant mounting tail that may be press-fit and coupled in to a higher tolerance through hole in a PCB that may not otherwise reliably couple a similar sized, conventional, current planer tuning fork-type terminal as shown in prior art FIG. 1. The non-contacting side rail portions of the electrical contact frame the electrical contact along the outer perimeter of the electrical contact along a majority portion of the length of the electrical contact that includes the mounting tail so as to provide a direct electrical path from the blade terminal received in the gap through the prongs to the mounting tail to the PCB that provides improved electrical conductivity performance of the electrical contact, especially in high electric current applications. A mounting tail formed of three sections that include extensions of the non-contacting portions of the prongs and the section extending from the base adds overall structural strength to the electrical contact. Cutouts formed in the electrical contact, when stamped, allow the formation of the mounting tail comprised of a plurality of sections of the electrical contact. The electrical contact may also be plated with another electrically-conductive material to further enhance the electrical conductivity of the electrical contact.

While this invention has been described in terms of the preferred embodiment thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its embodiments, it is to be understood that this disclosure is only illustrative and exemplary of the present invention and is made merely for purposes of providing a full and enabling disclosure of the invention. The foregoing disclosure is not intended to be construed to limit the present invention or otherwise to exclude any such other embodiments, adaptations, variations, modifications and equivalent arrangements, the present invention being limited only by the following claims and the equivalents thereof.

We claim:

1. An electrical contact comprising:
a pair of prongs that extend from a base of the electrical contact spaced apart by a gap disposed therebetween, the gap configured to receive a mating electrical contact that at least electrically communicates with the pair of prongs, and a plane defined along respective exterior surfaces of the pair of prongs is such that a portion of at least one prong in the pair of prongs is bisected by the plane; and a mounting tail in which said portion of at least one prong in the pair of prongs extends to form at least a portion of said mounting tail, wherein the electrical contact has a length disposed along a longitudinal axis.

2. The electrical contact according to claim 1, further including, a mounting tail extending from the base and configured for insertion in an opening defined in a printed circuit board (PCB) in which at least a portion of said mounting tail is bisected by said plane.

3. The electrical contact according to claim 1, wherein the respective prongs in the pair of prongs include a portion that is bisected by the plane.

4. The electrical contact according to claim 3, further including, a mounting tail that extends from the base being formed from a plurality of sections of the electrical contact.

5. The electrical contact according to claim 4, wherein the plurality of sections of the mounting tail comprise extended sections that are associated with the respective portions of the pair of prongs that are bisected by the plane.

6. The electrical contact according to claim 5, wherein the plurality of sections of the mounting tail further include a section that extends from the base.

7. The electrical contact according to claim 3, wherein the electrical contact is disposed along a longitudinal axis and the gap of the electrical contact axially receives the mating electrical contact, and the respective portions of the pair of prongs have a parallel, spaced relationship from the longitudinal axis.

8. The electrical contact according to claim 1, wherein the base defines a plurality of cutouts and said plane respectively bisects at least a portion of said plurality of cutouts.

9. An electrical contact comprising:
a pair of prongs that extend from a base of the electrical contact spaced apart by a gap disposed therebetween, the gap configured to receive a mating electrical contact that at least electrically communicates with the pair of prongs, and a plane defined along respective exterior surfaces of the pair of prongs is such that a portion of at least one prong in the pair of prongs is bisected by the plane,
wherein a cross section area of said at least one prong of the pair of prongs is disposed perpendicular to said plane and said cross section area comprises a non-rectangular cross section shape.

10. The electrical contact according to claim 9, wherein said non-rectangular cross section shape has an L-shaped cross section shape.

11. The electrical contact according to claim 9, further including, a mounting tail extending from the base and configured for insertion in an opening defined in a PCB in which at least a portion of said mounting tail is bisected by said plane.

12. A method of fabricating an electrical contact comprising:
stamping out a piece from a sheet of electrically-conducting material; and
folding one or more portions of the piece to at least produce a pair of prongs of the electrical contact spaced apart by a gap, and a plane defined along respective exterior surfaces of the pair of prongs is such that a portion of at least one prong in the pair of prongs is bisected by the plane; and
folding said one or more portions in a manner about a base of the electrical contact to form a mounting tail of the electrical contact, said mounting tail including a plurality of sections of the electrical contact in which a portion of the plurality of sections are respectively associated with, and extend from said pair of prongs.

13. The method according to claim 12, wherein the stamping step further includes,
stamping out a plurality of cutouts disposed adjacent the base of the electrical contact, and wherein the folding step further includes,
forming said mounting tail about said plurality of cutouts.

14. The method according to claim 12, further including, matching a moment of inertia profile associated with said electrical contact to have a same moment of inertia profile as a moment of inertia profile associated with a predetermined electrical contact.

15. The method according to claim 14, wherein the step of matching the moment of inertia profile occurs prior to the step of stamping out the piece and the step of folding said one or more portions.

16. The method according to claim 14, wherein the moment of inertia profile associated with the electrical contact is a function of at least one of,
(i) a material thickness of the piece,
(ii) a length of at least one non-contacting portion of the pair of prongs along a length of the electrical contact, and
(iii) a height of said at least one non-contacting portion of the pair of prongs of the electrical contact.

17. The method according to claim 12, wherein the plurality of sections comprise three (3) sections, and said three sections include,
(i) a section that extends from one of the prongs in the pair of prongs,
(ii) a section that extends from the other one of the pair of prongs in the pair of prongs, and
(iii) a section that extends from a base of the electrical contact.

18. An electrical assembly comprising:
at least one printed circuit board (PCB); and
at least one electrical contact disposed on the PCB, the electrical contact including,
a pair of prongs that extend from a base of the electrical contact spaced apart by a gap disposed therebetween, the gap configured to receive a mating electrical contact that at least electrically communicates with the pair of prongs, and a plane defined along respective exterior surfaces of the pair of prongs is such that a portion of at least one prong in the pair of prongs is bisected by the plane, and
a mounting tail in which said portion of at least one prong in the pair of prongs extends to form at least a portion of said mounting tail, wherein the electrical contact has a length disposed along a longitudinal axis.

19. The electrical assembly according to claim 18, wherein the electrical assembly is a bussed electrical center (BEC) disposed in a motorized vehicle.

* * * * *